(12) United States Patent
Sato (10) Patent No.: US 9,154,059 B2
(45) Date of Patent: Oct. 6, 2015

(54) MULTILEVEL INVERTER

(71) Applicant: FUJI ELECTRIC CO., LTD., Kawasaki-shi (JP)

(72) Inventor: Ikuya Sato, Tokyo (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 74 days.

(21) Appl. No.: 14/077,938

(22) Filed: Nov. 12, 2013

(65) Prior Publication Data

US 2014/0139159 A1    May 22, 2014

(30) Foreign Application Priority Data

Nov. 19, 2012  (JP) .................................. 2012-253399

(51) Int. Cl.
| | |
|---|---|
| *H02P 27/04* | (2006.01) |
| *H02P 3/02* | (2006.01) |
| *H02M 1/32* | (2007.01) |
| *H02M 7/487* | (2007.01) |
| *H02M 1/00* | (2007.01) |

(52) U.S. Cl.
CPC . *H02P 3/02* (2013.01); *H02M 1/32* (2013.01); *H02M 7/487* (2013.01); *H02M 2001/007* (2013.01)

(58) Field of Classification Search
USPC ............ 318/400.26, 400.27, 400.28, 400.29, 318/400.21, 721, 722, 799, 800, 801, 430, 318/432; 361/65, 88, 93.1, 43; 363/40, 363/56.03, 56.04, 56.05, 56.07; 388/800
See application file for complete search history.

(56) References Cited

U.S. PATENT DOCUMENTS

| | | | | |
|---|---|---|---|---|
| 4,190,340 | A * | 2/1980 | Maida | 396/265 |
| 4,210,826 | A * | 7/1980 | Baker | 327/412 |
| 8,803,456 | B2 * | 8/2014 | Zushi et al. | 318/400.22 |
| 2010/0309589 | A1 | 12/2010 | Ueki et al. | |

FOREIGN PATENT DOCUMENTS

| | | |
|---|---|---|
| JP | 2002-078351 A | 3/2002 |
| JP | 2010-284051 A | 12/2010 |

* cited by examiner

*Primary Examiner* — Antony M Paul
(74) *Attorney, Agent, or Firm* — Rabin & Berdo, P.C.

(57) ABSTRACT

In relation to a multilevel inverter of three levels or more, a decrease in safety due to breakdown is suppressed while avoiding destruction of switching elements. An inverter includes switching elements connected in series between a positive terminal and a negative terminal, reverse blocking switching elements connected one each between connection points of pairs of the switching elements and an intermediate terminal, alternating current output terminals, a control unit that generates control signals for switching between a turning on and turning off of the plurality of switching elements, a control signal interrupt circuit that, on an interrupt signal interrupting the output voltage of the alternating current output terminals being input, interrupts each of the control signals to the first switching elements and second switching elements, regardless of the state of the control signals, and a monitoring unit that diagnoses a breakdown of the control signal interrupt circuit.

10 Claims, 7 Drawing Sheets

MULTILEVEL INVERTER

BACKGROUND OF THE INVENTION

1. Field of the Invention

The present invention relates to a multilevel inverter that converts direct current power to alternating current power.

2. Description of the Background Art

In relation to an inverter that converts direct current power to alternating current power, the spread of a multilevel inverter wherein connections to a positive terminal, negative terminal, and intermediate terminal to which direct current voltage is applied are switched by switching elements (semiconductor switches) is increasing. As the switching voltage in the switching element connected to the intermediate terminal is low compared with that in the switching elements connected to the positive terminal and negative terminal, it is possible to select a switching element with low rated voltage, and thus possible to employ a switching element with comparatively good electrical characteristics.

However, in the event that all the switching elements are simultaneously turned off when attempting an emergency stop of a motor connected to the inverter, the difference in potential between the positive terminal and negative terminal is applied to the switching element with low rated voltage connected to the intermediate terminal, and there is concern about breakage. Therefore, there has been proposed a configuration wherein, when carrying out an emergency stop of a motor, the switching elements connected to the positive terminal and negative terminal are turned off first, and the switching element connected to the intermediate terminal is turned off after a slight delay (for example, refer to JP-A-2002-078351).

In recent years, however, in order to avoid personal damage from accidents caused by a breakdown of an electrical instrument, or the like, various international standards, established in order to bring risk within a tolerable range, have been developed. For example, IEC61800-5-2 requires the inclusion of a safe torque off (STO) function that, when carrying out an emergency stop of a motor, reliably stops the motor.

In relation to a two-level inverter, a configuration wherein a circuit that disables a switching element connected to a positive terminal and a circuit that disables a switching element connected to a negative terminal are provided individually has been proposed as a configuration appropriate for IEC61800-5-2 (for example, refer to JP-A-2010-284051). A two-level inverter is such that output to the motor is interrupted provided that the switching element of one of the positive terminal or negative terminal is disabled, because of which, even in the event that one of the heretofore described circuits breaks down, the motor is stopped provided that the other circuit functions normally.

SUMMARY OF THE INVENTION

For example, in relation to the kind of multilevel inverter of three levels or more described in JP-A-2002-078351, it is assumed that a circuit that disables the switching element connected to each terminal is provided individually for each terminal, as in the case of the two-level inverter described in JP-A-2010-284051. In this case, even when the switching element connected to one terminal among the positive terminal, negative terminal, and intermediate terminal is disabled, there is conduction between the other two terminals, meaning that it is not possible to safely stop the functioning unless the switching elements connected to at least two terminals are disabled.

Also, as heretofore described, the possibility of avoiding damage to the switching elements is increased by disabling the switching elements in a sequence based on the technology described in JP-A-2002-078351. However, a multilevel inverter of three levels or more is such that a circuit for stopping the functioning is complex compared with that of a two-level inverter, because of which there is concern that the breakdown rate will increase and safety decrease.

Therefore, the invention, bearing in mind these kinds of problem, has an object of providing a multilevel inverter such that, in relation to a multilevel inverter of three levels or more, it is possible to suppress a decrease in safety due to breakdown, while avoiding destruction of switching elements.

In order to solve the heretofore described problems, a multilevel inverter according to one aspect of the invention includes a plurality of direct current input terminals disposed in order of descending potential from a first to an $n^{th}$ (n is an odd number of 3 or more), first to $n-1^{th}$ switching elements connected in series between the first direct current input terminal and $n^{th}$ direct current input terminal, $n^{th}$ to $(n-1)(3/2)^{th}$ switching elements connected one each between first to $n-2^{th}$ connection points, which are connection points of pairs of the first to $n-1^{th}$ switching elements, and the second to $n-1^{th}$ direct current input terminals, alternating current output terminals connected to one connection point of the pairs of first to $n-1^{th}$ switching elements, a control unit that generates control signals for switching between a turning on and turning off of the first to $(n-1)(3/2)^{th}$ switching elements, a control signal interrupt circuit that, on an output interrupt signal for interrupting the output voltage of the alternating current output terminals being input, interrupts each of the control signals in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals, and a monitoring unit that outputs a diagnostic signal for diagnosing a breakdown of the control signal interrupt circuit to the control signal interrupt circuit, and diagnoses a breakdown of the control signal interrupt circuit based on a response of the control signal interrupt circuit against the diagnostic signal.

The control signal interrupt circuit, on the diagnostic signal being input, may interrupt each of the control signals in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

The monitoring unit, when the response of the control signal interrupt circuit against the diagnostic signal indicates a breakdown of the control signal interrupt circuit, may cause each of the control signals to be interrupted in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

The control signal interrupt circuit has two logic circuits, each of which, on either the output interrupt signal or diagnostic signal being input, outputs a control interrupt signal for interrupting the control signals, and the monitoring unit outputs the diagnostic signal to either one of the two logic circuits. When the control interrupt signal, which is the response from the logic circuit to the diagnostic signal, indicates a breakdown of the control signal interrupt circuit, the monitoring unit causes the other of the two logic circuits to interrupt each of the control signals to be interrupted in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

The multilevel inverter according to the aspect of the invention is such that, on the output interrupt signal being input into the control signal interrupt circuit, the control signal interrupt circuit outputs the control interrupt signal to the control unit. Then, after a predetermined time has elapsed from the output interrupt signal being input, the control signal interrupt circuit may interrupt each of the control signals in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals. In this case, the control unit, on the control interrupt signal being input, may turn on switching elements, among the plurality of switching elements, other than the first switching element and n−$1^{th}$ switching element, before the predetermined time elapses.

The multilevel inverter according to the aspect of the invention may further include photocouplers, provided in an input path of the control signal between the control unit and the switching elements directly connected to the direct current input terminals other than the $(n+1)/2^{th}$ direct current input terminal, and configured of a light emitting element and a light receiving element. In this case, the control signal interrupt circuit, by stopping the application of a power supply voltage to the light emitting element, interrupts each of the control signals in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

The multilevel inverter according to the aspect of the invention may further include three-state circuits, provided in an input path of the control signal between the control unit and the switching elements directly connected to the direct current input terminals other than the $(n+1)/2^{th}$ direct current input terminal, whose output can be switched to high impedance. In this case, the control signal interrupt circuit, by all the outputs of the control signal interrupt circuit being switched to outputs of high impedance, interrupts each of the control signals in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

The multilevel inverter according to the aspect of the invention may further include a series circuit of photocouplers configured of a light emitting element and a light receiving element and three-state circuits whose output can be switched to one of high impedance, provided in an input path of the control signal between the control unit and the switching elements directly connected to the direct current input terminals other than the $(n+1)/2^{th}$ direct current input terminal. In this case, the control signal interrupt circuit, by stopping the application of a power supply voltage to the light emitting element and by all the outputs of the control signal interrupt circuit being switched to outputs of high impedance, interrupts each of the control signals in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

As heretofore described, the invention is such that, in relation to a multilevel inverter of three levels or more, output voltage is interrupted safely even in the event of a breakdown, and destruction of switching elements is avoided.

DETAILED DESCRIPTION OF THE INVENTION

Hereafter, while referring to the attached drawings, a detailed description will be given of preferred embodiments of the invention. Dimensions, materials, other specific numerals, and the like, shown in such embodiments are merely examples for facilitating understanding of the invention, and do not limit the invention unless specifically stated. Redundant descriptions of elements having practically the same functions and configurations in the specification and drawings are omitted by such elements being given the same reference signs, and elements not directly connected to the invention are omitted from the drawings.

First Embodiment

Inverter 100

Figure 1:
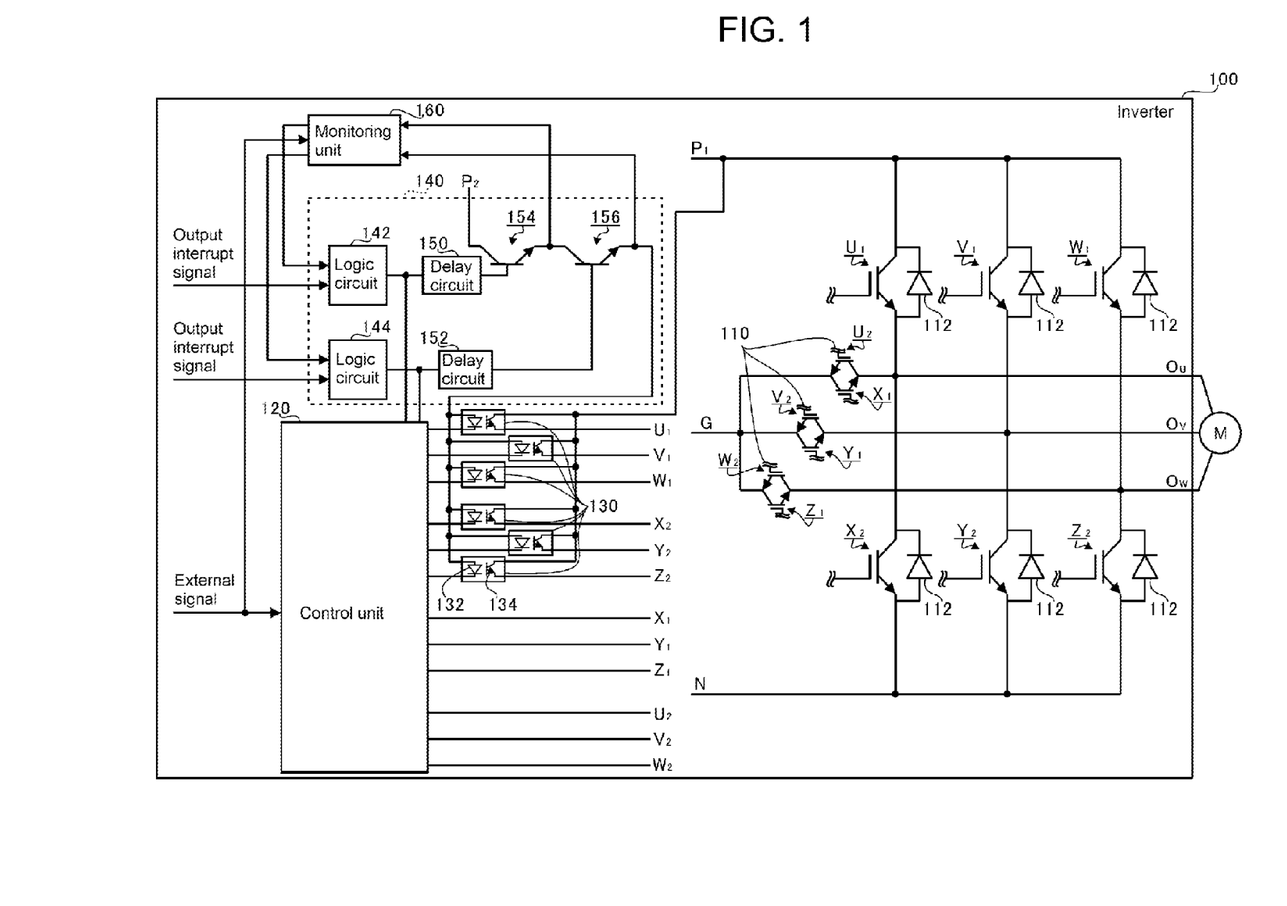
FIG. 1 is an illustration showing a schematic configuration of an inverter in a first embodiment.

FIG. 1 is an illustration showing a schematic configuration of an inverter 100 in a first embodiment. The inverter 100 is configured to include direct current input terminals (a positive terminal $P_1$, a negative terminal N, and an intermediate terminal G), switching elements (first switching elements $U_1$, $V_1$, and $W_1$ and second switching elements $X_2$, $Y_2$, and $Z_2$), reverse blocking switching elements 110, freewheeling diodes 112, a control unit 120, photocouplers 130, a control signal interrupt circuit 140, delay circuits 150 and 152, and a monitoring unit 160. The term "insulated gate bipolar transistor" (IGBT) is used for each switching element terminal.

The inverter 100 of this embodiment is an inverter including a plurality of direct current input terminals disposed in order of descending potential from first to $n^{th}$ (n is an odd number of 3 or more). Herein, a three-level inverter wherein n is 3, that is, including a first direct current input terminal (the positive terminal $P_1$), a second direct current input terminal (the intermediate terminal G), and a third direct current input terminal (the negative terminal N), is given as an example. Consequently, n=3, and switching elements from the first switching elements to second switching elements (=n−1$^{th}$) exist. Power converted by the inverter 100 from direct current to 3-phase alternating current is output to a motor M from alternating current output terminals $O_U$, $O_v$, and $O_w$ corresponding to a U-phase, V-phase, and W-phase respectively.

In the inverter 100, the first and second switching elements are connected in series between the positive terminal $P_1$ and negative terminal N. Of these, the first switching elements $U_1$, $V_1$, and $W_1$ are such that the collectors thereof are connected to the positive terminal $P_1$, the emitters are connected via the reverse blocking switching elements 110 to the intermediate terminal G, and the gates are connected to the control unit 120, to be described hereafter. Also, the second switching elements $X_2$, $Y_2$, and $Z_2$ are such that the emitters thereof are connected to the negative terminal N, the collectors are connected via the reverse blocking switching elements 110 to the intermediate terminal G, and the gates are connected to the control unit 120.

Each of the alternating current output terminals $O_U$, $O_v$, and $O_w$ is connected to a connection point of the first to n−1$^{th}$ switching elements, that is, the first switching elements $U_1$, $V_1$, and $W_1$ and second switching elements $X_2$, $Y_2$, and $Z_2$. That is, the alternating current output terminals $O_U$, $O_v$, and $O_w$ are connected to the connection point of one of a plurality of pairs of switching elements.

The reverse blocking switching elements 110 are $n^{th}$ to (n−1) (3/2)$^{th}$ switching elements. Herein, the reverse blocking switching elements 110 are connected one each between the connection points of the first switching elements $U_1$, $V_1$, and $W_1$ and second switching elements $X_2$, $Y_2$, and $Z_2$ and the second to n−1$^{th}$ direct current input terminals (herein, as n is 3, only the second direct current input terminal), that is, the second direct current input terminal (intermediate terminal G).

The reverse blocking switching elements 110 are configured of two switching elements (elements $U_2$, $V_2$, and $W_2$ and elements $X_1$, $Y_1$, and $Z_1$) with reverse blocking capability connected in anti-parallel.

Owing to the configuration wherein the reverse blocking switching elements 110 are connected between other switching elements (the first switching elements $U_1$, $V_1$, and $W_1$ and second switching elements $X_2$, $Y_2$, and $Z_2$) and the intermediate terminal G, it is possible to reduce the number of diodes to protect IGBTs against reverse breakdown in comparison with a heretofore known case wherein bidirectional switches are provided. As well as this, it is possible to reduce on-state voltage by an amount commensurate with the reduction in diodes.

Also, the freewheeling diodes 112 are disposed one in each switching element (the first switching elements $U_1$, $V_1$, and $W_1$ and second switching elements $X_2$, $Y_2$, and $Z_2$) in order to avoid overvoltage caused by back electromotive force. The freewheeling diode 112 is such that the cathode thereof is connected to the collector, while the anode is connected to the emitter. An arm is configured of a combination of the freewheeling diode 112 and a switching element.

The control unit 120 is configured of a field-programmable gate array (FPGA) or application specific integrated circuit (ASIC). The control unit 120, in response to an external signal from an unshown external device, generates control signals formed of a pulse signal (gate pulse), thereby switching between a turning on and off of the switching elements (the first switching elements $U_1$, $V_1$, and $W_1$ and second switching elements $X_2$, $Y_2$, and $Z_2$) and a turning on and off of each direction of the reverse blocking switching elements 110. In FIG. 1, in order to facilitate understanding, one portion of the connection paths from the control unit 120 to the switching elements is omitted.

Further, the control unit 120, for example, subjects the control signal to pulse width modulation (PWM), thereby generating an output voltage waveform for the alternating current output terminal $O_U$, an output voltage waveform for the alternating current output terminal $O_v$, and an output voltage waveform for the alternating current output terminal $O_w$. At this time, the control unit 120 is such that an alternating current voltage waveform of a frequency indicated by an external signal from an external device is simulatively recreated.

When the motor M is being driven, the control unit 120, on receiving a control signal stopping the motor M from an external device, stops the generation of the relevant control signals, thereby turning off the switching elements. At this time, the control unit 120 stops the generation of the control signals to the first switching elements $U_1$, $V_1$, and $W_1$ and second switching elements $X_2$, $Y_2$, and $Z_2$ (turns off the switches) before stopping the generation of the control signal to the reverse blocking switching elements 110 (the elements $U_2$, $V_2$, $W_2$, $X_1$, $Y_1$, and $Z_1$). With such a configuration, it is possible to prevent the application of a large voltage to the reverse blocking switching elements 110.

Also, the control unit 120 has a high calculation capability whereby it regulates the time for which each switching element is on and off using PWM control, or the like, as heretofore described. A drawback to this, however, is that the structure has to be complex in order to deal with this kind of complex processing, and there is a risk of breakdown. Therefore, in this embodiment, a safe torque off (STO) function that reliably stops the motor M at a time of a motor M emergency stop, or the like, is included using the photocouplers 130 and control signal interrupt circuit 140.

The photocouplers 130 are provided in control signal input paths provided between the control unit 120 and the first switching elements $U_1$, $V_1$, and $W_1$ and second switching elements $X_2$, $Y_2$, and $Z_2$. The photocoupler 130 is configured of a light emitting element 132 (a light emitting diode) and a light receiving element 134 (a phototransistor), and voltage from the control signal interrupt circuit 140, to be described hereafter, is applied to the anode of the light emitting element 132. The control unit 120, using negative logic, causes the light emitting element 132 to emit light by changing the voltage of a terminal connected to the cathode of the light emitting element 132 to a low level, thereby outputting a control signal. Also, the positive terminal $P_1$ is connected to the collector of the light receiving element 134. Owing to the photocouplers 130, transmission of a signal is possible with insulation maintained in the control signal paths from the control unit 120 to the first switching elements $U_1$, $V_1$, and $W_1$ and second switching elements $X_2$, $Y_2$, and $Z_2$.

The control signal interrupt circuit 140 outputs control interrupt signals to the photocouplers 130 in response to an external signal from an external device at a time of a motor M emergency stop, or the like. The photocouplers 130, on an output interrupt signal being input, interrupt the control signals to the first switching elements $U_1$, $V_1$, and $W_1$ and second switching elements $X_2$, $Y_2$, and $Z_2$, regardless of whether or not there is any input of a control signal. At this time, the external signal output from the external device is an output interrupt signal for interrupting the output voltage of the alternating current output terminals $O_U$, $O_V$, and $O_W$. The external device forming the transmission source of the output interrupt signal may be the same as the external device that transmits an external signal to the control unit 120, or may be a separate device.

Herein, the process of turning off the first switching elements $U_1$, $V_1$, and $W_1$ and second switching elements $X_2$, $Y_2$, and $Z_2$ is implemented by stopping the application of a power supply voltage to the anodes of the light emitting elements 132 of the photocouplers 130. That is, the control signal interrupt circuit 140, by stopping the application of voltage to the photocouplers 130, interrupts the control signal to each of the first switching elements $U_1$, $V_1$, and $W_1$ and second switching elements $X_2$, $Y_2$, and Z. In this embodiment, the stopping of the application of voltage to the photocouplers 130 forms a control interrupt signal for interrupting the control signal from the control unit 120 to the switching elements.

A multilevel inverter of the invention uses the photocouplers 130 in a mechanism interrupting the control signals to the first switching elements $U_1$, $V_1$, and $W_1$ and second switching elements $X_2$, $Y_2$, and Z. Because of this, it is possible to sever the connections between the control unit 120 and the first switching elements $U_1$, $V_1$, and $W_1$ and second switching elements $X_2$, $Y_2$, and $Z_2$ at one time, and thus possible to stop the motor M with a simple configuration. Moreover, even in the unlikely event that an abnormal current flows from the switching element side, insulation is maintained by the photocouplers 130, because of which it is possible to avoid breakdown of the control unit 120. Also, it is also possible to suppress noise caused by a high frequency, such as a clock frequency, on the control unit 120 side being transmitted to the switching element side.

Also, in this embodiment, the control signal interrupt circuit 140 is configured of two logic circuits 142 and 144, the delay circuits 150 and 152, and transistors 154 and 156. Output interrupt signals are input individually into the logic circuits 142 and 144. Herein, an external device that transmits an external signal to the logic circuits 142 and 144 may be provided separately for each of the logic circuits 142 and 144, or may be the same device. Each of the logic circuits 142 and 144 is a circuit that outputs a control interrupt signal on an output interrupt signal being input, and a torque off function of the logic circuits 142 and 144 is duplicated in the inverter 100.

The delay circuits 150 and 152 are provided in voltage transmission paths to the photocouplers 130 from the logic circuits 142 and 144 respectively. The delay circuit 150 is connected to the base of the transistor 154, whose collector side is connected to a positive terminal $P_2$ and the emitter side of the transistor 154 is connected to the collector side of the transistor 156.

The delay circuit 152 is connected to the base of the transistor 156, and the photocouplers 130 are connected in parallel to the emitter of the transistor 156. In this way, the bases of each of the serially connected transistors 154 and 156 are connected via the delay circuits 150 and 152 to the logic circuits 142 and 144.

Because of this, the structure is such that when the application of voltage to either one of the logic circuits 142 and 144 is stopped, no voltage is applied to the photocouplers 130. That is, each of the logic circuits 142 and 144 can individually execute a torque off function.

Further, the delay circuits 150 and 152 delay the process of turning off the first switching elements $U_1$, $V_1$, and $W_1$ and second switching elements $X_2$, $Y_2$, and $Z_2$ with the logic circuits 142 and 144 beyond the process of turning off the switching elements with the control signal of the control unit 120.

Figure 2A:
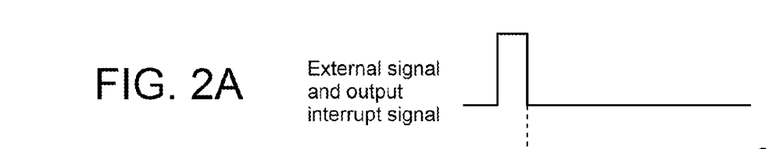
FIGS. 2A to 2E are illustrations for describing an output voltage interruption process.

FIGS. 2A to 2E are illustrations for describing an output voltage interruption process. It is assumed that, when the motor M is being driven by outputting an alternating current voltage, the control unit 120 receives an external signal stopping the motor M from an external device, as shown in FIG. 2A. At the same time, each of the logic circuits 142 and 144 configuring the control signal interrupt circuit 140 receives an output interrupt signal.

Then, the control signal interrupt circuit 140, on the output interrupt signal being input, outputs control interrupt signals to the photocouplers 130 via the delay circuits 150 and 152. As shown in FIG. 1, the control interrupt signal is also input into the control unit 120 in tandem with the input into the delay circuit 150, because of which the control unit 120 can start a control stopping the motor M, even in the event that the input of the external signal has not been normally carried out.

Figure 2B:
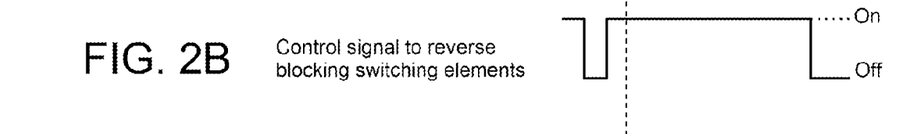
Figure 2C:
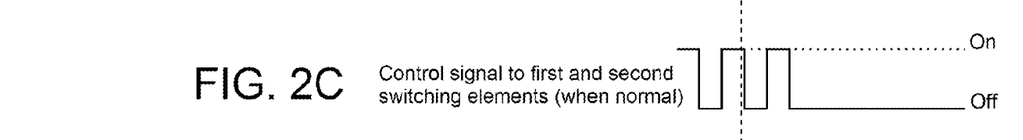

The control unit 120 outputs control signals maintaining the reverse blocking switching elements 110 in an on-state before a predetermined time elapses, as shown in FIG. 2B. Subsequently, the control unit 120 outputs control signals turning off the first switching elements $U_1$, $V_1$, and $W_1$ and second switching elements $X_2$, $Y_2$, and $Z_2$, as shown in FIG. 2C. At this time, the power supply voltage is still being applied to the anodes of the light emitting elements 132 of the photocouplers 130, and the control signals are transmitted to the first switching elements $U_1$, $V_1$, and $W_1$ and second switching elements $X_2$, $Y_2$, and $Z_2$ via the photocouplers 130.

At this time, provided that the reverse blocking switching elements 110 are turned on normally, and the first switching elements $U_1$, $V_1$, and $W_1$ and second switching elements $X_2$, $Y_2$, and $Z_2$ are turned off normally, it is possible to avoid destruction of the switching elements.

Figure 2D:
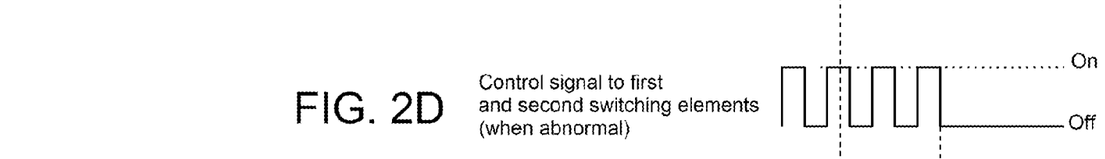
Figure 2E:
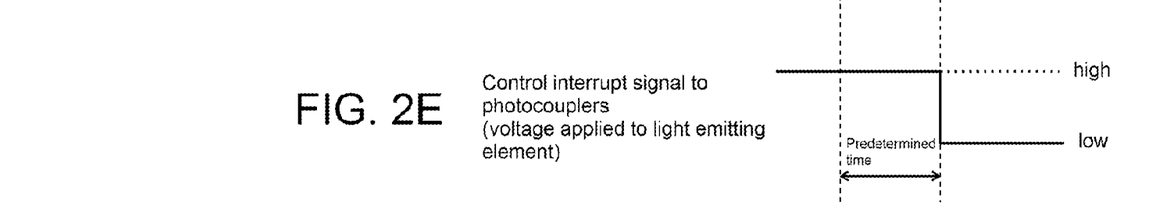

Also, a situation wherein it is not possible for the control unit 120 to turn off the first switching elements $U_1$, $V_1$, and $W_1$ and second switching elements $X_2$, $Y_2$, and $Z_2$ normally is also envisaged, as shown in FIG. 2D. In this case too, on the output interrupt signal being input into the control signal interrupt circuit 140 and a predetermined time elapsing, the control interrupt signals that have passed through the delay circuits 150 and 152 reach the photocouplers 130 as shown in FIG. 2E. Then, the application of voltage to the anodes of the light emitting elements 132 of the photocouplers 130 is stopped. In this way, the control signal interrupt circuit 140 interrupts the control signal to each of the first switching elements $U_1$, $V_1$, and $W_1$ and second switching elements $X_2$, $Y_2$, and $Z_2$, regardless of the state of the control signal (the safe torque off (STO) function).

Then, after the predetermined time has elapsed and the first switching elements $U_1$, $V_1$, and $W_1$ and second switching elements $X_2$, $Y_2$, and $Z_2$ have been turned off, the control unit 120 outputs control signals turning off the reverse blocking switching elements 110, as shown in FIG. 2B.

As it is only the potential of the intermediate terminal G that is output to the motor M, the motor M is stopped even in the event that it is not possible for the control unit 120 to turn off the reverse blocking switching elements 110 normally.

However, in the event that the control signal interrupt circuit 140 breaks down, the heretofore described kind of STO function ceases to work. Therefore, the inverter 100 includes the monitoring unit 160, which diagnoses a breakdown of the control signal interrupt circuit 140. Herein, firstly, a description will be given of a case wherein the monitoring unit 160 carries out a breakdown diagnosis while the motor M is stopped (when no control signal is generated by the control unit 120).

The monitoring unit 160, in response to a predetermined trigger (for example, each predetermined cycle), outputs a diagnostic signal for diagnosing a breakdown of the control signal interrupt circuit 140 to each of the logic circuits 142 and 144. The diagnostic signal causes the logic circuits 142 and 144 to function in the same way as, for example, an interrupt signal.

Then, control interrupt signals output via the logic circuits 142 and 144, delay circuits 150 and 152, and transistors 154 and 156 are input into the monitoring unit 160 as a response from the control signal interrupt circuit 140. A breakdown diagnosis process is carried out using the control interrupt signals output from the transistors 154 and 156.

Figure 3:
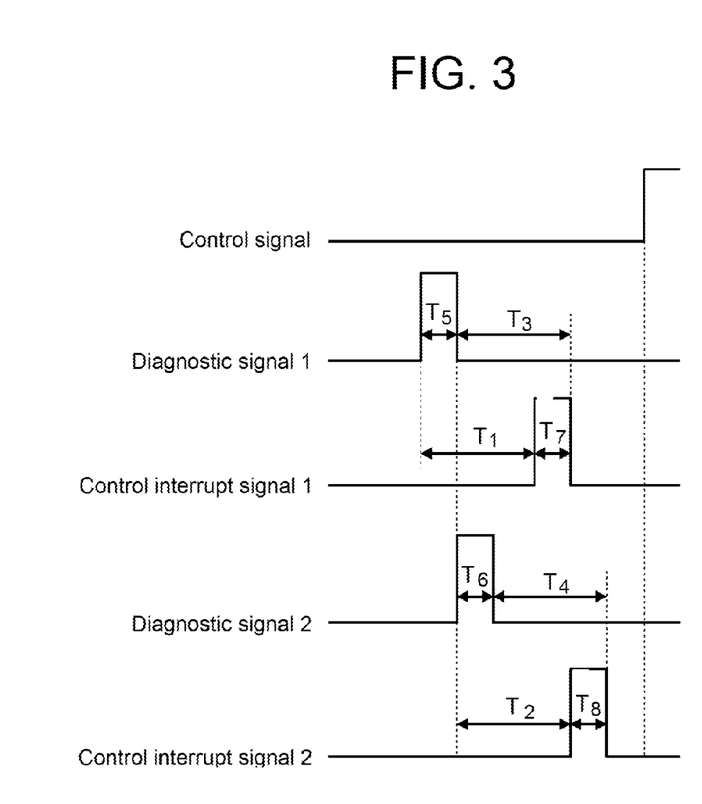
FIG. 3 is an illustration for describing a breakdown diagnosis process of a monitoring unit.

FIG. 3 is an illustration for describing the breakdown diagnosis process of the monitoring unit 160. On the breakdown diagnosis process of the monitoring unit 160 being started while the motor M is stopped, the monitoring unit 160 transmits a diagnostic signal 1. On a control signal being generated by the control unit 120 during the breakdown diagnosis process, the breakdown diagnosis process is cancelled.

As shown in FIG. 3, the diagnostic signal 1 and a diagnostic signal 2 are each configured of a rectangular pulse wave, and the monitoring unit 160 outputs the diagnostic signal 1 and diagnostic signal 2 at timings such that they do not temporally overlap. Then, the monitoring unit 160 monitors a control interrupt signal 1 corresponding to the diagnostic signal 1 and a control interrupt signal 2 corresponding to the diagnostic signal 2.

Specifically, the monitoring unit 160, after the start of the output of the diagnostic signal 1, compares a delay time $T_1$ until the control interrupt signal 1 is input and a normal delay time range specified based on the logic circuit 142 and delay circuit 150. In the event that the delay time is not included in the normal delay time range, the monitoring unit 160 determines that the control signal interrupt circuit 140 (one of the logic circuit 142, delay circuit 150, or transistor 154) has broken down.

In the same way, the monitoring unit 160, after the start of the output of the diagnostic signal 2, compares a delay time $T_2$ until the control interrupt signal 2 is input and a normal delay time range specified based on the logic circuit 144 and delay circuit 152. In the event that the delay time is not included in the normal delay time range, the monitoring unit 160 determines that the control signal interrupt circuit 140 (one of the logic circuit 144, delay circuit 152, or transistor 156) has broken down.

Also, the diagnostic signal 1 and diagnostic signal 2 are configured of rectangular waves. Herein, the monitoring unit 160, in addition to the delay times $T_1$ and $T_2$, measures delay times $T_3$ and $T_4$ from the end of the output of the diagnostic signal 1 and diagnostic signal 2 until the end of the input of the control interrupt signal 1 and control interrupt signal 2. Then, the monitoring unit 160 compares each of the delay times $T_3$ and $T_4$ with a corresponding normal delay time, and determines whether there is a breakdown.

In addition, the monitoring unit 160 compares time bands $T_5$ and $T_6$ from the start of the output until the end of the output of the diagnostic signal 1 and diagnostic signal 2 respectively and time bands $T_7$ and $T_8$ from the start of the input until the end of the input of the control interrupt signal 1 and control interrupt signal 2 respectively. By so doing, the monitoring unit 160 determines whether there is a breakdown based on whether or not the comparison result is included in a tolerated error range.

Herein, a description has been given of a case wherein a breakdown diagnosis is carried out while the motor M is stopped, but a breakdown diagnosis by the monitoring unit 160 can also be carried out while the motor M is operating. For example, a configuration wherein the output interrupt signal is input into the monitoring unit 160 in addition to the control signal interrupt circuit 140 is adopted. In this case, a way of carrying out an application of voltage to the anodes of the light emitting elements 132 of the photocouplers 130 during the breakdown diagnosis is provided separately, and the monitoring unit 160 carries out a breakdown diagnosis when no output interrupt signal is being input. Also, by the transistors 154 and 156 being connected in parallel, a breakdown diagnosis may be performed on one of the logic circuits 142 and 144 while the other is kept operating normally.

In this way, the monitoring unit 160 outputs a diagnostic signal to either one of the two logic circuits 142 and 144, and detects a control interrupt signal, which is a response to the diagnostic signal from the logic circuits 142 and 144. Then, when the control interrupt signal indicates a breakdown of the control signal interrupt circuit 140, the monitoring unit 160 outputs a diagnostic signal to the other of the two logic circuits 142 and 144. In this way, the control signals to the first switching elements $U_1$, $V_1$, and $W_1$ and second switching elements $X_2$, $Y_2$, and $Z_2$ are each interrupted.

Owing to the configuration including the monitoring unit 160, the inverter 100, when the control signal interrupt circuit 140 breaks down, can easily detect and repair the breakdown. Further, as the probability of the logic circuits 142 and 144 both breaking down simultaneously is equivalent to the breakdown rates of the two multiplied together, it is possible to increase safety markedly compared to when there is one logic circuit.

Also, this embodiment is such that, even when one of the logic circuits 142 and 144 breaks down, the other executes the motor M torque off function, because of which a further increase in safety is possible for the inverter 100.

Also, in this embodiment, a description has been given of a case wherein the control signal interrupt circuit 140 includes the two logic circuits 142 and 144, but the control signal interrupt circuit 140 may also not include two logic circuits. In this case too, when the response to a diagnostic signal from the control signal interrupt circuit 140 indicates a breakdown of the control signal interrupt circuit 140, the monitoring unit 160 interrupts each of the control signals to the first switching elements $U_1$, $V_1$, and $W_1$ and second switching elements $X_2$, $Y_2$, and $Z_2$.

Specifically, it is sufficient that the monitoring unit 160 is configured so that it can stop the application of voltage to the anodes of the light emitting elements 132 of the photocouplers 130 (not shown). Also, a path (not shown) such that the monitoring unit 160 can notify the control unit 120 of a breakdown of the control signal interrupt circuit 140 may be provided, and the first switching elements $U_1$, $V_1$, and $W_1$ and second switching elements $X_2$, $Y_2$, and $Z_2$ turned off by control signals of the control unit 120. Apart from this, provided that the first switching elements $U_1$, $V_1$, and $W_1$ and second switching elements $X_2$, $Y_2$, and $Z_2$ can be turned off when the monitoring unit 160 detects a breakdown of the control signal interrupt circuit 140, the method is not particularly limited.

Second Embodiment

Inverter 200

The first embodiment is such that the photocouplers 130 are included, and the control signal interrupt circuit 140 stops the application of voltage to the photocouplers 130. A description has been given of a case wherein, by so doing, the process of turning off the first switching elements $U_1$, $V_1$, and $W_1$ and second switching elements $X_2$, $Y_2$, and $Z_2$ is implemented. In a second embodiment, three-state circuits 230 and 232 are included instead of the photocouplers 130. Further, a description will be given of a case wherein a control signal interrupt circuit 240 implements the process of turning off the first switching elements $U_1$, $V_1$, and $W_1$ and second switching elements $X_2$, $Y_2$, and $Z_2$ via the three-state circuits 230 and 232. In the second embodiment, the same reference signs are given to configurations the same as those in the first embodiment, and a detailed description thereof is omitted.

Figure 4:
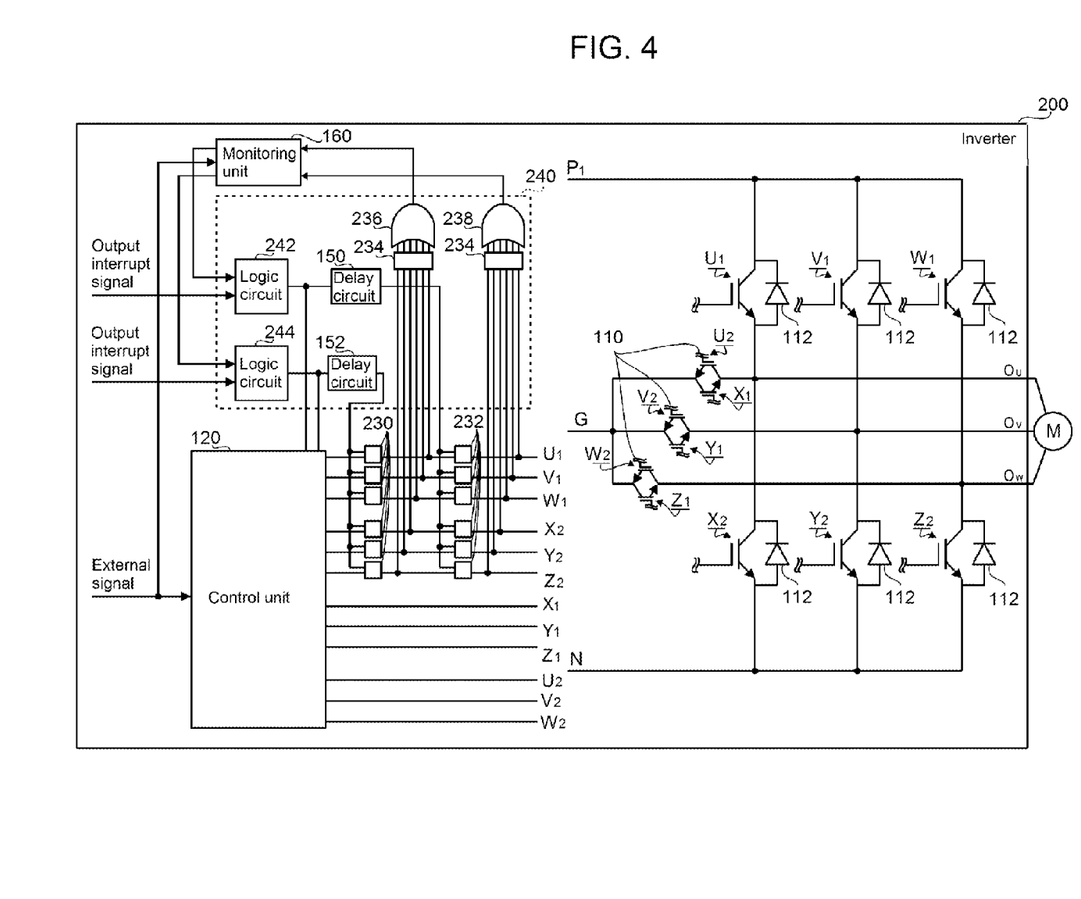
FIG. 4 is an illustration showing a schematic configuration of an inverter in a second embodiment.

FIG. 4 is an illustration showing a schematic configuration of an inverter 200 in the second embodiment. As shown in FIG. 4, the inverter 200 is configured to include direct current input terminals (the positive terminal $P_1$, negative terminal N, and intermediate terminal G), switching elements (the first switching elements $U_1$, $V_1$, and $W_1$ and second switching elements $X_2$, $Y_2$, and $Z_2$), the reverse blocking switching elements 110, the freewheeling diodes 112, the control unit 120, the three-state circuits 230 and 232, pull-down circuits 234, OR circuits 236 and 238, the control signal interrupt circuit 240, the delay circuits 150 and 152, and the monitoring unit 160. Herein, a detailed description will be given of the three-state circuits 230 and 232, pull-down circuits 234, OR circuits 236 and 238, and control signal interrupt circuit 240, whose configuration differs from that of the first embodiment.

Each of the three-state circuits 230 and 232 is configured of a logic circuit whose output can be switched to one of high impedance, and is provided between the control unit 120 and the first switching elements $U_1$, $V_1$, and $W_1$ and second switching elements $X_2$, $Y_2$, and Z. Also, the three-state circuits 230 are connected further to the control unit 120 side than the three-state circuits 232.

The pull-down circuits 234 are provided one each in connection paths between the three-state circuits 230 and three-state circuits 232 and connection paths between the three-state circuits 232 and the first switching elements $U_1$, $V_1$, and $W_1$ and second switching elements $X_2$, $Y_2$, and $Z_2$. When the output of the three-state circuits 230 and 232 is of a high impedance, the output of the pull-down circuit 234 is fixed at a low level. As a result of this, the first switching elements $U_1$, $V_1$, and $W_1$ and second switching elements $X_2$, $Y_2$, and $Z_2$ are turned off.

Herein, a description will be given of a case wherein the pull-down circuits 234 are disposed in the inverter 200. However, provided that the design is such that the first switching elements $U_1$, $V_1$, and $W_1$ and second switching elements $X_2$, $Y_2$, and $Z_2$ are turned off when the output of the three-state circuits 230 and 232 is of a high impedance, pull-up circuits may be disposed instead of the pull-down circuits 234.

The control signal interrupt circuit 240, on an output interrupt signal being received from an external device, interrupts the control signals to each of the first switching elements $U_1$, $V_1$, and $W_1$ and second switching elements $X_2$, $Y_2$, and $Z_2$, regardless of whether or not there is any output of a control signal.

Specifically, the control signal interrupt circuit 240 is configured of logic circuits 242 and 244, the pull-down circuits 234, and the OR circuits 236 and 238. The logic circuits 242 and 244 are connected to the three-state circuits 230 and 232 respectively. The logic circuits 242 and 244 control so that all outputs of the three-state circuits 230 and 232 are changed to outputs of high impedance at one time, thereby turning off the first switching elements $U_1$, $V_1$, and $W_1$ and second switching elements $X_2$, $Y_2$, and $Z_2$ by interrupting each of the control signals thereto.

As the two three-state circuits 230 and 232 are connected in series, the first switching elements $U_1$, $V_1$, and $W_1$ and second switching elements $X_2$, $Y_2$, and $Z_2$ to which the three-state circuits 230 and 232 are connected are turned off provided that the output of either one of the three-state circuits 230 and 232 is of a high impedance. That is, each of the logic circuits 242 and 244 individually has a torque off function.

In this way, in the same way as in the first embodiment, an interrupt signal is input into the control signal interrupt circuit 240 in the inverter 200. Then, regardless of whether or not a control signal has been generated by the control unit 120, the control signal interrupt circuit 240 turns off the first switching elements $U_1$, $V_1$, and $W_1$ and second switching elements $X_2$, $Y_2$, and $Z_2$. Consequently, it is possible to prevent destruction of the reverse blocking switching elements 110 caused by overvoltage, and to increase safety using the STO function.

In particular, in the second embodiment, the three-state circuits 230 and 232 are used in the mechanism turning off the first switching elements $U_1$, $V_1$, and $W_1$ and second switching elements $X_2$, $Y_2$, and $Z_2$. Because of this, the inverter 200 is little affected by age deterioration, and it is possible to reliably execute the motor M torque off function.

Also, the output of the three-state circuits 230 is input via the pull-down circuit 234 into one of the OR circuits 236, and in the same way, the output of the three-state circuits 232 is input via the pull-down circuit 234 into one of the OR circuits 238. The monitoring unit 160 carries out a breakdown diagnosis process in accordance with the logical sum output of each of the OR circuits 236 and OR circuits 238. That is, provided that the OR circuits 236 and 238 output at a high level, the monitoring unit 160 determines that the logic circuits 242 and 244 corresponding to the outputs are broken down, despite the three-state circuits 230 having a high impedance.

In this way, in the same way as in the first embodiment, owing to the configuration including the monitoring unit 160, the inverter 200, when either one of the logic circuits 242 and 244 breaks down, can easily detect and repair the breakdown. As the probability of the logic circuits 242 and 244 both breaking down simultaneously is equivalent to the breakdown rates of the two multiplied together, it is possible to increase safety markedly compared to when there is one three-state circuit.

Figure 5:
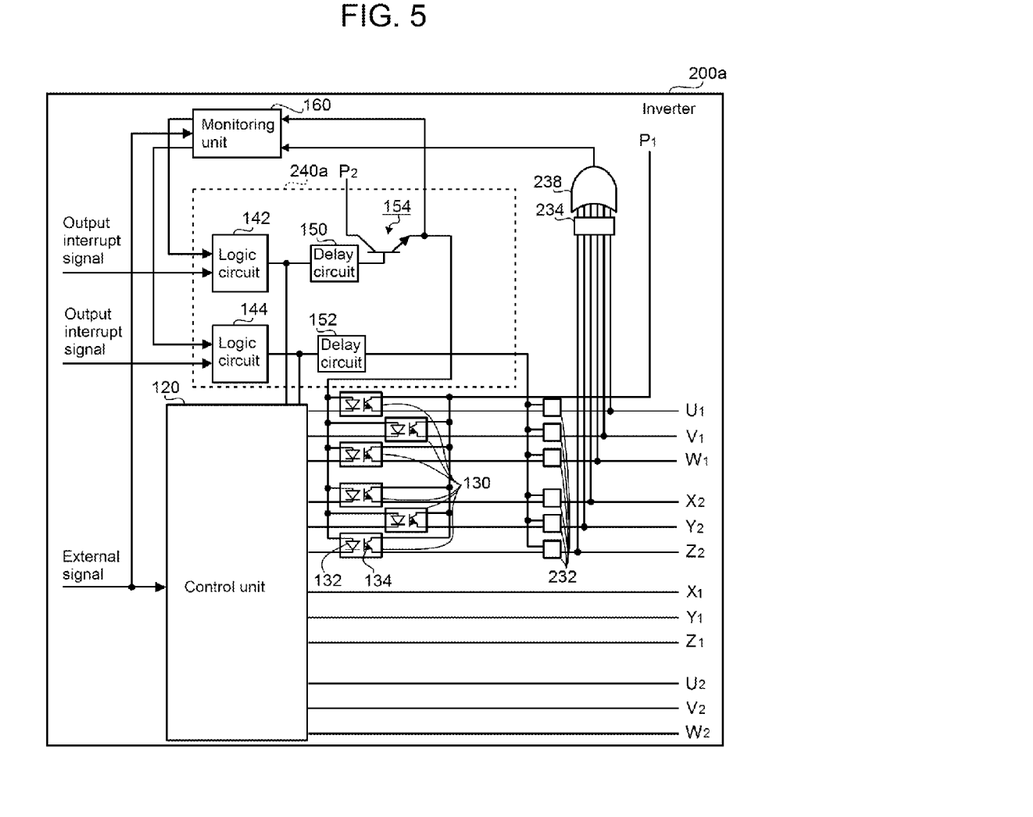
FIG. 5 is an illustration showing a schematic configuration of an inverter in a modification example.

FIG. 5 is an illustration showing a schematic configuration of an inverter 200a in a modification example. In FIG. 5, the configurations of the switching elements, which are essentially equivalent to those shown in FIGS. 1 and 4, are omitted in order to show the flow of signals on the control unit 120 side enlarged and thus easy to understand.

The inverter 200a, as shown in FIG. 5, combines the first embodiment and second embodiment, including both the photocouplers 130 and three-state circuits 232.

Specifically, series circuits of the photocouplers 130 and three-state circuits 232 are provided in control signal input paths between the control unit 120 and the first switching elements $U_1$, $V_1$, and $W_1$ and second switching elements $X_2$, $Y_2$, and $Z_2$.

Further, the photocoupler 130 is such that the logic circuit 142 is connected via the delay circuit 150 and transistor 154 to the anode of the light emitting element 132, and voltage from the control signal interrupt circuit 240a is applied thereto. Also, the three-state circuit 232 is connected via the delay circuit 152 to the logic circuit 144.

Further, the control signal interrupt circuit 240a stops the application of power supply voltage to the light emitting elements 132, and controls so that all outputs of the three-state circuits 232 are changed to outputs of high impedance at one time. By so doing, the first switching elements $U_1$, $V_1$, and $W_1$ and second switching elements $X_2$, $Y_2$, and $Z_2$ are turned off by each of the control signals thereto being interrupted.

As the structures of the photocoupler 130 and three-state circuit 232 are different, durability with respect to environmental conditions such as temperature, humidity, and vibration is different. Consequently, the probability of both the photocoupler 130 and three-state circuit 232 breaking simultaneously is lower than the probability of two of the photocouplers 130 or two of the three-state circuits 230 and 232 breaking simultaneously. Because of this, the inverter 200a is such that it is possible to further increase safety.

Third Embodiment

Inverter 300

In the first and second embodiments, descriptions have been given of the inverters 100 and 200, which are three-level inverters. In a third embodiment, a description will be given of an inverter 300, which is a five-level inverter. In the third embodiment, the same reference signs are given to configurations the same as those in the first and second embodiments, and a detailed description thereof is omitted.

Figure 6:
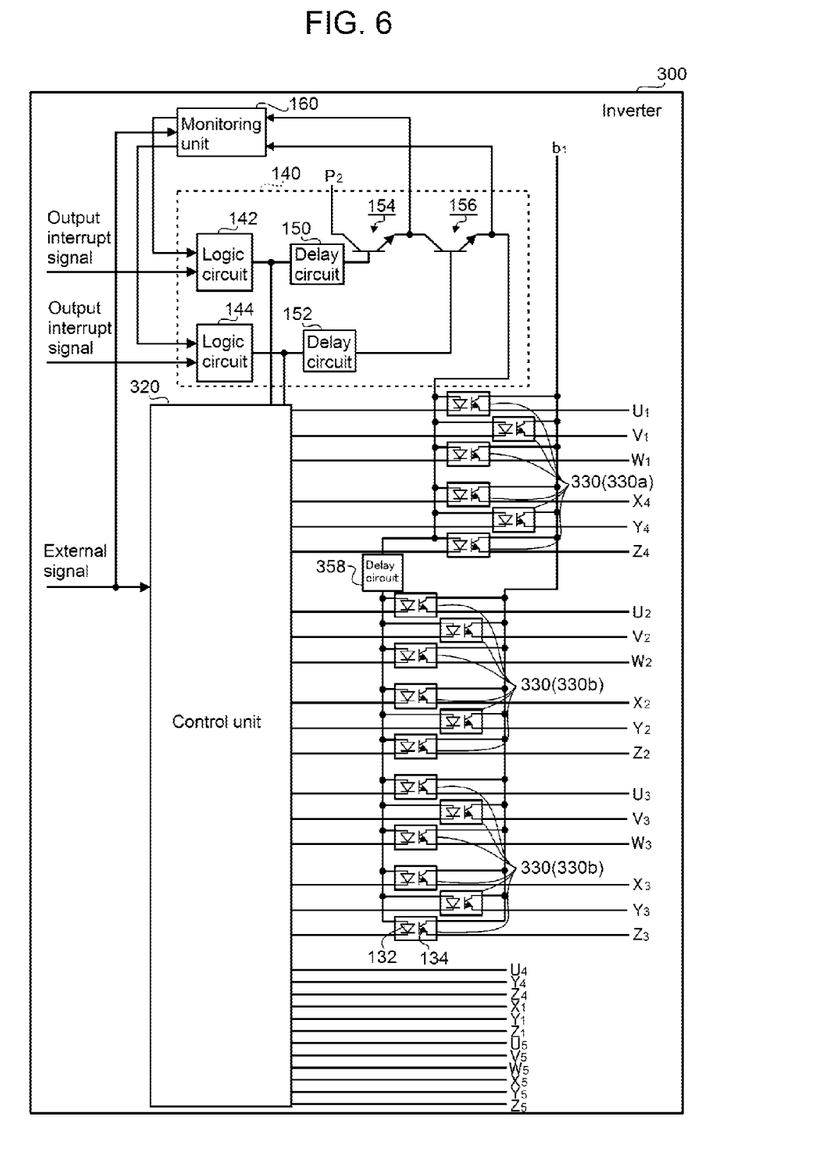
FIG. 6 is a first drawing showing a schematic configuration of an inverter in a third embodiment.
Figure 7:
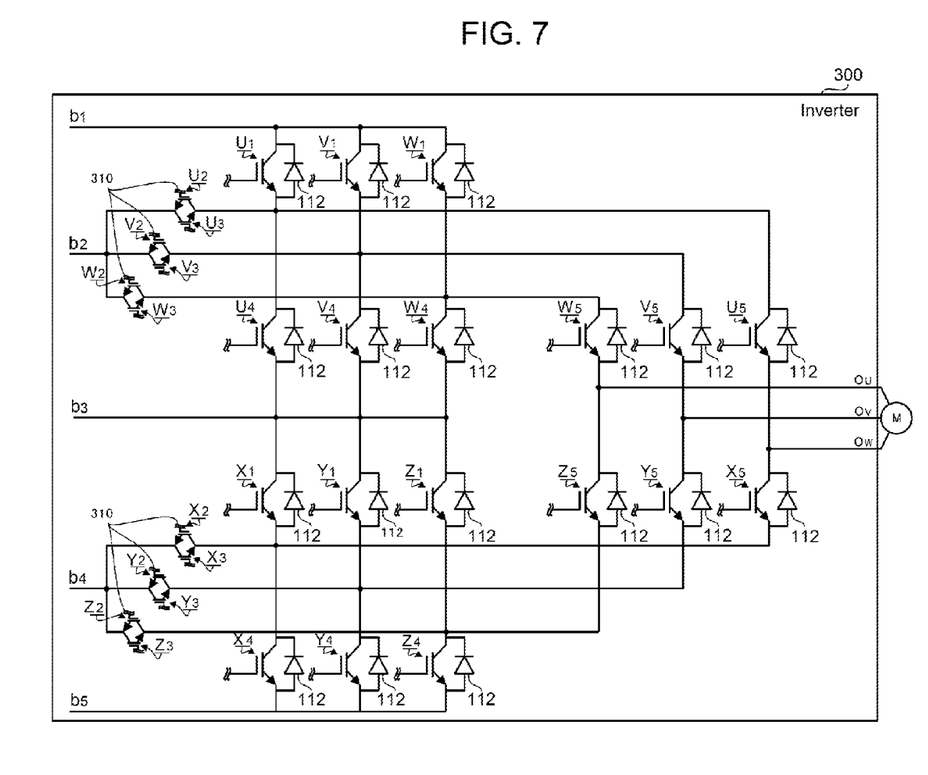
FIG. 7 is a second drawing showing a schematic configuration of the inverter in the third embodiment.

FIG. 6 is a first drawing showing a schematic configuration of the inverter 300 in the third embodiment, while FIG. 7 is a second drawing showing a schematic configuration of the inverter 300 in the third embodiment. Herein, as each drawing is shown enlarged so as to facilitate understanding, one inverter 300 is shown divided between two drawings. Also, in FIGS. 6 and 7, a connection path from a control unit 320 shown in FIG. 6 to each switching element shown in FIG. 7 is shown with one portion omitted in order to facilitate understanding.

As shown in FIGS. 6 and 7, the inverter 300 is configured to include a first direct current input terminal $b_1$ to a fifth direct current input terminal $b_5$, switching elements (the first switching elements $U_1$, $V_1$, and $W_1$, second switching elements $U_4$, $V_4$, and $W_4$, third switching elements $X_1$, $Y_1$, and $Z_1$, fourth switching elements $X_4$, $Y_4$, and $Z_4$, fifth switching elements $U_5$, $V_5$, and $W_5$, and sixth switching elements $X_5$, $Y_5$, and $Z_5$), reverse blocking switching elements 310, the freewheeling diodes 112, the control unit 320, photocouplers 330, the control signal interrupt circuit 140, the delay circuits 150 and 152 and a delay circuit 358, and the monitoring unit 160. Herein, a detailed description will be given of the first direct current input terminal $b_1$ to fifth direct current input terminal $b_5$, switching elements, reverse blocking switching elements 310, control unit 320, photocouplers 330, and delay circuit 358, whose configuration differs from that of the first embodiment.

The direct current input terminals are disposed in order of descending potential from the first direct current input terminal $b_1$ to the fifth direct current input terminal $b_5$. That is, whereas n is 3 in the first embodiment, n is 5 in the third embodiment.

In the inverter 300, a plurality of switching elements (the first switching elements $U_1$, $V_1$, and $W_1$, second switching elements $U_4$, $V_4$, and $W_4$, third switching elements $X_1$, $Y_1$, and $Z_1$, fourth switching elements $X_4$, $Y_4$, and $Z_4$, fifth switching elements $U_5$, $V_5$, and $W_5$, and sixth switching elements $X_5$, $Y_5$, and $Z_5$) are connected between the first direct current input terminal $b_1$ and fifth direct current input terminal $b_5$.

Of these, the first switching elements $U_1$, $V_1$, and $W_1$ are such that the collectors thereof are connected to the positive terminal $P_1$, the emitters are connected via the reverse blocking switching elements 310 to the second direct current input terminal $b_2$, and the gates are connected to the control unit 320. Also, the fourth (=n-$1^{th}$) switching elements $X_4$, $Y_4$, and $Z_4$ are such that the emitters thereof are connected to the fifth direct current input terminal $b_5$, the collectors are connected via the reverse blocking switching elements 310 to the fourth direct current input terminal $b_4$, and the gates are connected to the control unit 320.

Also, the second switching elements $U_4$, $V_4$, and $W_4$ and third switching elements $X_1$, $Y_1$, and $Z_1$ are connected in series between the first switching elements $U_1$, $V_1$, and $W_1$ and fourth switching elements $X_4$, $Y_4$, and $Z_4$. Furthermore, the fifth switching elements $U_5$, $V_5$, and $W_5$ and sixth switching elements $X_5$, $Y_5$, and $Z_5$ connected in series in each phase are connected in parallel to the second switching elements $U_4$, $V_4$, and $W_4$ and third switching elements $X_1$, $Y_1$, and $Z_1$ connected in series in each phase. Each of the alternating current output terminals $O_U$, $O_V$, and $O_W$ is connected to a connection point of the fifth switching elements $U_5$, $V_5$, and $W_5$ and sixth switching elements $X_5$, $Y_5$, and $Z_5$.

The reverse blocking switching elements 310 are connected one each between a connection point in each phase of a plurality of switching elements, herein the first switching elements $U_1$, $V_1$, and $W_1$ and second switching elements $U_4$, $V_4$, and $W_4$, and the second direct current input terminal $b_2$. Furthermore, the reverse blocking switching elements 310 are also connected one each between a connection point in each phase of the third switching elements $X_1$, $Y_1$, and $Z_1$ and fourth switching elements $X_4$, $Y_4$, and $Z_4$ and the fourth direct current input terminal $b_4$. The reverse blocking switching elements 310 are configured of two switching elements (the elements $U_2$, $V_2$, and $W_2$ and elements $U_3$, $V_3$, and $W_3$ and the elements $X_2$, $Y_2$, and $Z_2$ and elements $X_3$, $Y_3$, and $Z_3$) with reverse blocking capability connected in anti-parallel.

The control unit 320 is of the same configuration as in the first embodiment, but exhibits partially different behavior as the number of switching elements has increased. Specifically, when the motor M is being driven, the control unit 320, on receiving a control signal stopping the motor M from an external device, stops the generation of the relevant control signal, thereby turning off the switching elements. At this time, the control unit 320 stops the generation of the control signals to the first switching elements $U_1$, $V_1$, and $W_1$ and fourth switching elements $X_4$, $Y_4$, and $Z_4$ before stopping the generation of the control signals to the reverse blocking switching elements 310, second switching elements $U_4$, $V_4$, and $W_4$, third switching elements $X_1$, $Y_1$, and $Z_1$, fifth switching elements $U_5$, $V_5$, and $W_5$, and sixth switching elements $X_5$, $Y_5$, and $Z_5$.

In this condition too, conduction is possible between the second direct current input terminal $b_2$ to fourth direct current input terminal $b_4$ and the alternating current output terminals $O_U$, $O_V$, and $O_W$. Because of this, there is concern about destruction due to overvoltage in the event that the remaining switching elements (the reverse blocking switching elements 310, second switching elements $U_4$, $V_4$, and $W_4$, third switching elements $X_1$, $Y_1$, and $Z_1$, fifth switching elements $U_5$, $V_5$, and $W_5$, and sixth switching elements $X_5$, $Y_5$, and $Z_5$) are unintentionally turned off.

Next, therefore, the generation of the control signals to the reverse blocking switching elements 310 is stopped. Subsequently, the generation of the control signals to the second switching elements $U_4$, $V_4$, and $W_4$, third switching elements $X_1$, $Y_1$, and $Z_1$, fifth switching elements $U_5$, $V_5$, and $W_5$, and sixth switching elements $X_5$, $Y_5$, and $Z_5$ is stopped. By the switching elements being turned off in this kind of sequence, destruction of the switching elements is avoided.

The photocoupler 330 is of the same configuration as the photocoupler 130 of the first embodiment. However, in addition to being provided between the control unit 320 and the first switching elements $U_1$, $V_1$, and $W_1$ and second switching elements $U_4$, $V_4$, and $W_4$, the photocouplers 330 are also provided in control signal input paths between the control unit 320 and the reverse blocking switching elements 310 (the elements $U_2$, $V_2$, and $W_2$ and elements $U_3$, $V_3$, and $W_3$ and the elements $X_2$, $Y_2$, and $Z_2$ and elements $X_3$, $Y_3$, and $Z_3$).

The photocouplers 330, in the same way as the photocouplers 130, are connected in parallel to the emitter of the transistor 156. A control interrupt signal is transmitted as it is from the emitter of the transistor 156 to photocouplers 330a that carry out an interruption of control signals to the first switching elements $U_1$, $V_1$, and $W_1$ and second switching elements $U_4$, $V_4$, and $W_4$.

Meanwhile, the delay circuit 358 is provided in connection paths from the emitter of the transistor 156 to photocouplers 330b that carry out an interruption of control signals to the reverse blocking switching elements 310. Because of this, when a control interrupt signal is output from the transistor 156, firstly, the control signals to the first switching elements $U_1$, $V_1$, and $W_1$ and second switching elements $U_4$, $V_4$, and $W_4$ are interrupted by the photocouplers 330a. Subsequently, an interruption of the control signals to the reverse blocking switching elements 310 is carried out by the photocouplers 330b.

After the elapse of a delay time caused by the delay circuits 150, 152, and 358, the control unit 320 stops the generation of control signals to the remaining switching elements (the second switching elements $U_4$, $V_4$, and $W_4$, third switching elements $X_1$, $Y_1$, and $Z_1$, fifth switching elements $U_5$, $V_5$, and $W_5$, and sixth switching elements $X_5$, $Y_5$, and $Z_5$).

As heretofore described, according to the inverter 300 of the third embodiment, it is possible to execute the STO function while avoiding destruction of the switching elements, despite the inverter 300 being a five-level inverter. Also, as the monitoring unit 160 is included, in the same way as in the first and second embodiments and modification example, it is possible when the control signal interrupt circuit 140 breaks down to easily detect and repair the breakdown, and thus possible to increase safety.

Heretofore, a description has been given, while referring to the attached drawings, of preferred embodiments of the invention, but it goes without saying that the invention is not limited to these embodiments. It is clear that those skilled in the art may conceive of various changes or revisions without deviating from the scope of the claims, and it is of course understood that these changes and revisions fall within the technical scope of the invention.

In the first to third embodiments, a description has been given of a case wherein the control signal interrupt circuits 140 and 240 are configured so as to be duplicated by including the two logic circuits 142 and 144, 242 and 244. However, the control signal interrupt circuits 140 and 240 may also not be duplicated.

Also, in the first and second embodiments and modification example, a description has been given of the inverters 100, 200, and 200a, which are three-level inverters, while in the third embodiment, a description has been given of the inverter 300, which is a five-level inverter. However, it being sufficient that the inverter is of three levels or more, the inverter may also be an inverter of seven levels or more.

The invention can be utilized in a multilevel inverter that converts direct current power to alternating current power.

While the present invention has been particularly shown and described with reference to certain specific embodiments, it will be understood by those skilled in the art that the foregoing and other changes in form and details can be made therein without departing from the spirit and scope of the present invention.

What is claimed is:

1. A multilevel inverter, comprising:
    a plurality of direct current input terminals disposed in order of descending potential from a first to an $n^{th}$ (n is an odd number of 3 or more);
    first to $n-1^{th}$ switching elements connected in series between the first direct current input terminal and $n^{th}$ direct current input terminal;
    $n^{th}$ to $(n-1)(3/2)^{th}$ switching elements connected one each between first to $n-2^{th}$ connection points, which are connection points of pairs of the first to $n-1^{th}$ switching elements, and the second to $n-1^{th}$ direct current input terminals;
    alternating current output terminals connected to one connection point of the pairs of first to $n-1^{th}$ switching elements;
    a control unit that generates control signals for switching between a turning on and turning off of the first to $(n-1)(3/2)^{th}$ switching elements;
    a control signal interrupt circuit that, on an output interrupt signal for interrupting an output voltage of the alternating current output terminals being input, interrupts each of the control signals in sequence from that of a switching element directly connected to a direct current input terminal having the greatest difference in potential from that of an $(n+1)/2^{th}$ direct current input terminal to that of the switching element directly connected to the direct current input terminal having a smallest difference in potential from that of the $(n+1)/2^{th}$ direct current input terminal, regardless of the state of the control signals; and
    a monitoring unit that outputs a diagnostic signal for diagnosing a breakdown of the control signal interrupt circuit to the control signal interrupt circuit, and diagnoses a breakdown of the control signal interrupt circuit based on a response of the control signal interrupt circuit against the diagnostic signal.

2. The multilevel inverter according to claim 1, wherein the control signal interrupt circuit, on the diagnostic signal being input, interrupts each of the control signals in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

3. The multilevel inverter according to claim 1, wherein the monitoring unit, when a response of the control signal interrupt circuit against the diagnostic signal indicates a breakdown of the control signal interrupt circuit, causes each of the control signals to be interrupted in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

4. The multilevel inverter according to claim 1, wherein
the control signal interrupt circuit has two logic circuits, each of which, on either the output interrupt signal or diagnostic signal being input, outputs a control interrupt signal for interrupting the control signals, and
the monitoring unit outputs the diagnostic signal to either one of the two logic circuits and, when the control interrupt signal, which is a response from a logic circuit to the diagnostic signal, indicates a breakdown of the control signal interrupt circuit, causes an other of the two logic circuits to interrupt each of the control signals to be interrupted in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

5. The multilevel inverter according to claim 1, wherein
the control signal interrupt circuit, on the output interrupt signal being input, outputs the control interrupt signal to the control unit and, after a predetermined time has elapsed from the output interrupt signal being input, interrupts each of the control signals in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals, and
the control unit, on the control interrupt signal being input, turns on switching elements, among the plurality of switching elements, other than the first switching element and $n-1^{th}$ switching element, before the predetermined time elapses.

6. The multilevel inverter according to claim 1, further comprising
photocouplers, provided in an input path of the control signal between the control unit and switching elements directly connected to the direct current input terminals other than the $(n+1)/2^{th}$ direct current input terminal, and configured of a light emitting element and a light receiving element, wherein
the control signal interrupt circuit, by stopping an application of a power supply voltage to the light emitting element, interrupts each of the control signals in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

7. The multilevel inverter according to claim 1, further comprising three-state circuits, provided in an input path of the control signal between the control unit and switching elements directly connected to the direct current input terminals other than the $(n+1)/2^{th}$ direct current input terminal, whose output can be switched to high impedance, wherein
the control signal interrupt circuit, by all of outputs of the control signal interrupt circuit being switched to outputs of high impedance, interrupts each of the control signals in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

8. The multilevel inverter according to claim 1, further comprising
a series circuit of photocouplers configured of a light emitting element and a light receiving element and three-state circuits whose output can be switched to one of high impedance, provided in an input path of the control signal between the control unit and the switching elements directly connected to the direct current input terminals other than the $(n+1)/2^{th}$ direct current input terminal, wherein
the control signal interrupt circuit, by stopping an application of a power supply voltage to the light emitting element and by all of outputs of the control signal interrupt circuit being switched to outputs of high impedance, interrupts each of the control signals in sequence from that of the switching element directly connected to the direct current input terminal having the greatest difference in potential from that of the $(n+1)/2^{th}$ direct current input terminal to that of the switching element directly connected to the direct current input terminal having the smallest difference in potential from that of the $(n+1)/2^{th}$ direct current input terminal, regardless of the state of the control signals.

9. An apparatus, comprising:
a plurality of direct current input terminals;
a plurality of alternating current output terminals connected to a motor;
a plurality of switching elements connected to the plurality of direct current input terminals and the plurality of alternating current output terminals; and
a control signal interrupt device configured to, in response to an interrupt signal for stopping the motor, interrupt control signals to the plurality of switching elements in a sequence corresponding to respective differences in potential between respective ones of the plurality of direct current input terminals.

10. The apparatus of claim 9, wherein in the sequence, a control signal to a switching element of the plurality of switching elements connected to a first terminal of the plurality of direct current input terminals having a greater difference in potential from a second terminal of the plurality of direct current input terminals than a difference in potential between a third terminal of the plurality of direct current input terminals and the second terminal of the plurality of direct current input terminals is interrupted before a control signal to another switching element of the plurality of switching elements connected to the third terminal of the plurality of direct current input terminals is interrupted.

* * * * *